United States Patent
Zhang et al.

(10) Patent No.: US 11,258,519 B2
(45) Date of Patent: Feb. 22, 2022

(54) QUANTUM RECEIVER AND METHOD FOR DECODING AN OPTICAL SIGNAL

(71) Applicant: Arizona Board of Regents on Behalf of the University of Arizona, Tuscon, AZ (US)

(72) Inventors: Zheshen Zhang, Tucson, AZ (US); Chaohan Cui, Tucson, AZ (US); Quntao Zhuang, Tucson, AZ (US); William Horrocks, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 17/190,250

(22) Filed: Mar. 2, 2021

(65) Prior Publication Data

US 2021/0273731 A1    Sep. 2, 2021

Related U.S. Application Data

(60) Provisional application No. 62/984,215, filed on Mar. 2, 2020.

(51) Int. Cl.
| | |
|---|---|
| *H04B 10/00* | (2013.01) |
| *H04B 10/61* | (2013.01) |
| *H04B 10/70* | (2013.01) |
| *G06N 10/00* | (2022.01) |
| *G06N 3/08* | (2006.01) |
| *G06N 3/067* | (2006.01) |
| *H04B 10/63* | (2013.01) |
| *H04J 14/00* | (2006.01) |

(52) U.S. Cl.
CPC ........... *H04B 10/616* (2013.01); *G06N 3/067* (2013.01); *G06N 3/08* (2013.01); *G06N 10/00* (2019.01); *H04B 10/63* (2013.01); *H04B 10/70* (2013.01)

(58) Field of Classification Search
CPC ...... H04B 10/60; H04B 10/61; H04B 10/616; H04B 10/6165; H04B 10/63; H04B 10/70
See application file for complete search history.

(56) References Cited

U.S. PATENT DOCUMENTS

| | | | | |
|---|---|---|---|---|
| 2012/0177385 | A1* | 7/2012 | Guha | H04B 10/70 398/202 |
| 2020/0112777 | A1* | 4/2020 | Schmalen | H04B 10/61 |

\* cited by examiner

*Primary Examiner* — Daniel G Dobson
(74) *Attorney, Agent, or Firm* — Lathrop GPM LLP

(57) ABSTRACT

A quantum receiver for decoding an optical signal includes a beamsplitter for interfering the optical signal with a local-oscillator field to generate a displaced field, and a single-photon detector for detecting the displaced field. The quantum receiver also includes a signal-processing circuit for determining, based on an electrical output of the single-photon detector, a measurement outcome. The signal-processing circuit also determines, based on the measurement outcome and a feed-forward machine-learning model, a next displacement. The quantum receiver also includes at least one modulator for modulating, based on the next displacement, one or both of the optical signal and the local-oscillator field. Like a Dolinar receiver, the quantum receiver implements adaptive measurements to reduce the error probability of the decoded symbol. The use of machine-learning reduces the latency of the signal-processing circuit, thereby increasing the number of measurements that may be performed for each received symbol.

20 Claims, 5 Drawing Sheets

QUANTUM RECEIVER AND METHOD FOR DECODING AN OPTICAL SIGNAL

RELATED APPLICATIONS

This application claims priority to U.S. Provisional Patent Application No. 62/984,215, filed Mar. 2, 2020, the entirety of which is incorporated herein by reference.

BACKGROUND

A communication system generally includes one or more sources, one or more receivers, and one or more channels. A source and a receiver communicate with each other via a respective channel. The source encodes a symbol onto a signal and transmitted the signal, after which the receiver decodes the transmitted signal to recover the symbol, subject to an error rate. The communication channel may, however, be affected by loss and noise that lead to degradation of encoded information. The receiver may incorporate error correction to at least partly mitigate this degradation. For example, error correction may be applied to the outputs of a homodyne detector to decode the signal with an acceptable error rate, as long as the signal-to-noise ratio of the transmitted signal is above a certain threshold determined by the employed error-correcting code. For very lossy communication channels, however, the signal-to-noise ratio of the transmitted signal may be further reduced by the fundamental quantum noise, in which case the signal cannot be decoded by a homodyne detector, and the symbol cannot be accurately determined.

SUMMARY

Quantum information theory has shown that the Holevo bound is below the error rate of a homodyne receiver. Accordingly, many techniques have been explored to improve upon the homodyne receiver's performance. For example, the Dolinar receiver asymptotically approaches the Helstrom bound by using information feed-forward. The Dolinar receiver separates the signal into infinitely small time segments, and displaces the signal based on the single-photon detection history. In practice, the time segment duration is limited by the fastest feed-forward processing time, and is therefore limited to a finite number of time modes. Nevertheless, it still surpasses the performance of the homodyne detector even with such experimental imperfections.

The Dolinar receiver and its variants minimize the posterior error rate with the assumption of equal time segmentation, and therefore can be thought of as a problem for mathematical optimization. However, when the received signal includes time-dependent noise or features, the number of coefficients needed to mathematical describe the error rate blows up quickly. Accordingly, the amount of time needed to compute the next displacement of the signal (i.e., latency) increases rapidly, thereby forcing the duration of each time segment to increase, in turn reducing the symbol rate (for a fixed error rate).

The present embodiments feature a quantum receiver that uses deep learning, and other machine-learning techniques, to rapidly provide feed-forward signals. The quantum receiver may be thought of as a generalized Dolinar receiver without restrictions such as equal time segmentation or Markovian feedforward. Three machine-learning architectures are explored: an artificial neural network (ANN), a probabilistic binary tree classifier (PBT), and runtime stochastic optimization with automatic differentiation (AD). These architectures handle the logic of hypothesis updating, displacement generation, measurements, feedforward parameters, and decisions simultaneously. For a particular architecture, the quantum receiver can be programmed to learn the history-dependent displacements to minimize the overall error rate.

In embodiments, a quantum receiver for decoding an optical signal includes a beamsplitter for interfering the optical signal with a local-oscillator field to generate a displaced field, and a single-photon detector for detecting the displaced field. The quantum receiver also includes a signal-processing circuit for determining, based on an electrical output of the single-photon detector, a measurement outcome. The signal-processing circuit also determines, based on the measurement outcome and a feed-forward machine-learning model, a next displacement. The quantum receiver also includes at least one modulator for modulating, based on the next displacement, one or both of the optical signal and the local-oscillator field.

In other embodiments, a method for decoding an optical signal includes interfering the optical signal with a local-oscillator field to generate a displaced field. The method also includes detecting the displaced field with a single-photon detector and determining, based on an electrical output of the single-photon detector, a measurement outcome. The method also includes determining, based on the measurement outcome and a feed-forward machine-learning model, a next displacement. The method also includes modulating, based on the next displacement, one or both of the optical signal and the local-oscillator field.

DETAILED DESCRIPTION

Figure 1:
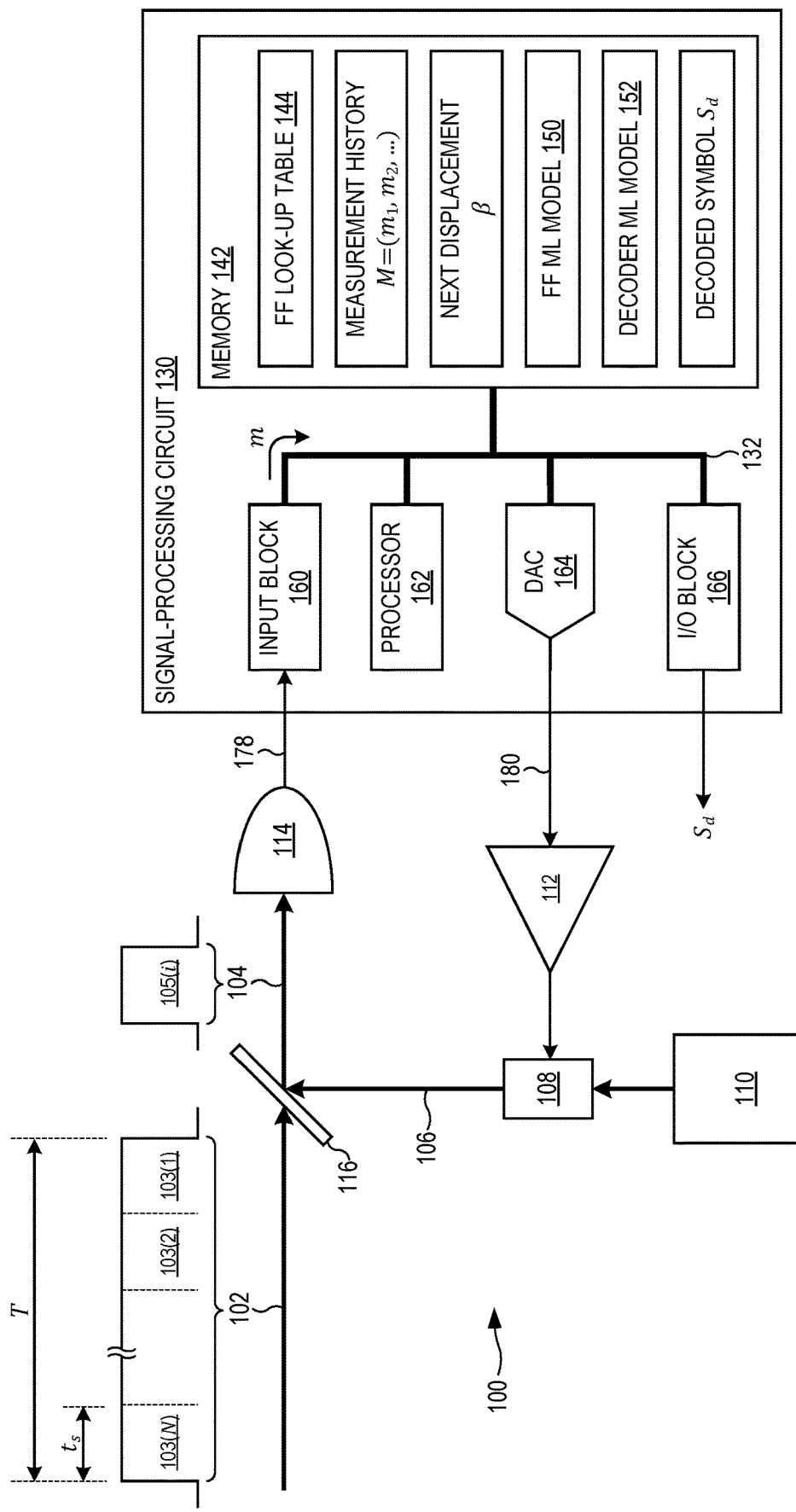
FIG. 1 shows a quantum receiver for decoding an optical signal, in an embodiment.

FIG. 1 shows a quantum receiver 100 for decoding an optical signal 102. The quantum receiver 100 includes a beamsplitter 116 that interferes a portion of the optical signal 102 with a portion of a local-oscillator field 106 to generate a displaced field 104, and a single-photon detector 114 that detects the displaced field 104. The quantum receiver 100 also includes a signal-processing circuit 130 that receives an electrical output signal 178 from the single-photon detector 114, generates a displacement signal 180, and outputs a decoded symbol $S_d$. The displacement signal 180 drives a modulator 108 to control one or both of the phase and amplitude of the local-oscillator field 106. In some embodiments, the quantum receiver 100 includes a local-oscillator laser 110 that generates the local-oscillator field 106.

The optical signal 102 is in a quantum state that encodes one symbol $S_e$ from a constellation, or alphabet, of possible symbols. Three encoding schemes are considered in the following discussion. The first is binary phase-shift keying (BPSK), which encodes one bit of information as either a first coherent state $|\alpha\rangle$ or a second coherent state $|-\alpha\rangle$. The second encoding scheme is quadrature phase-shift keying (QPSK), which encodes two bits of information as one of four coherent states $\{|\alpha\rangle, |-\alpha\rangle, |i\alpha\rangle, |-i\alpha\rangle\}$. The third encoding scheme is pulse-position modulation (PPM), which encodes the coherent state $|\alpha\rangle$ and the vacuum state $|0\rangle$ in different time slots. The present embodiments may be used with another encoding scheme (e.g., quadrature amplitude modulation) without departing from the scope hereof. Furthermore, while the present embodiments are described as encoding symbols with coherent states of the optical signal 102, non-coherent quantum states (e.g., squeezed states or entangled states) may be alternatively used without departing from the scope hereof.

The modulator 108 may be a phase modulator (e.g., an electro-optic modulator) that controls only the phase of the local-oscillator field 106. Alternatively, the modulator 108 may be an amplitude modulator (e.g., an acousto-optic modulator) that controls only the amplitude of the local-oscillator field 106. For modulating schemes that require both amplitude and phase control of the local-oscillator field 106 (e.g., quadrature amplitude modulation) the modulator 108 in FIG. 1 represents both a phase modulator and an amplitude modulator connected in series. In this case, the signal-processing circuit 130 may output two displacement signals 180, one for the amplitude modulator and the other for the phase modulator.

The signal-processing circuit 130 may be implemented as a real-time embedded system located proximate to the single-photon detector 114, beamsplitter 116, and modulator 108. The signal-processing circuit 130 includes a memory 142 that communicates with a processor 162 over a bus 132, and that stores data used by the processor 162 to implement the functionality described herein. For example, in FIG. 1 the memory 142 is shown storing a feed-forward (FF) look-up table 144, a measurement history M, a next displacement β(M), a FF machine-learning (ML) model 150, a decoder ML model 152, and the decoded symbol $S_d$. However, the memory 142 may store additional data than shown in FIG. 1 without departing from the scope hereof. Accordingly, the signal-processing circuit 130 performs classical computations, and therefore should not be interpreted as performing quantum computations or implementing quantum circuits.

The signal-processing circuit 130 includes an input block 160 that receives the electrical output signal 178 to determine a binary measurement outcome m. For example, the measurement outcome m may be "1" when the single-photon detector 114 detects one or more photons of the displaced field 104, and "0" when the single-photon detector 114 does not detect any photon. The input block 160 is connected to the bus 132, over which the measurement outcome m is transmitted to the memory 142 for storage therein. As shown in FIG. 1, the input block 160 receives the electrical output signal 178 as a digital signal. When the electrical output signal 178 is an analog signal, the input block 160 may be replaced by a digitizer (e.g., an analog-to-digital converter) that converts the electrical output signal 178 into a digital bit representing the binary measurement outcome m.

The signal-processing circuit 130 also includes a digital-to-analog converter (DAC) 164 that outputs the displacement signal 180. As shown in FIG. 1, an amplifier 112 may be used to transform the displacement signal 180 according to the driving requirements of the modulator 108. However, the amplifier 112 may be excluded if the displacement signal 180 is capable of directly driving the modulator 108. The signal-processing circuit 130 also includes an input/output I/O block 166 through which the signal-processing circuit 130 may communicate with another electronic device. For example, the I/O block 166 may implement a communications port (e.g., USB, Ethernet, Wi-Fi, parallel, SPI, etc.). The signal-processing circuit 130 may then use the I/O block 166 to output the decoded symbol $S_d$.

The signal-processing circuit 130 forms a hypothesis $S_h$ about the symbol $S_e$ encoded on the optical signal 102. Based on the hypothesis $S_h$, the signal-processing circuit 130 generates the displacement signal 180 such that the local-oscillator field 106 has an amplitude and/or phase that, when interfering with the optical signal 102, results in the displaced field 104 being in a displaced quantum state that is different from the quantum state associated with the symbol $S_e$. For example, many adaptive measurement schemes target the displaced quantum state to be equal, or near, the vacuum state $|0\rangle$ in phase space. In this case, if the hypothesis $S_h$ is correct, then the displaced field 104 is in the vacuum state $|0\rangle$ and the single-photon detector 114 is unlikely to detect a photon, resulting in a binary measurement outcome of "0" that supports the hypothesis $S_h$. If the hypothesis $S_h$ is incorrect, then the displaced field 104 is not in the vacuum state $|0\rangle$ and the single-photon detector 114 is likely to measure a photon. In this case, the resulting binary measurement outcome is likely to be "1", which may result in the quantum receiver 100 updating the hypothesis $S_h$ to a different symbol. However, an adaptive measurement scheme does not need to use the vacuum state $|0\rangle$ as the target for the displaced quantum state. Accordingly, the present embodiments may target a displaced quantum state other than the vacuum state $|0\rangle$ without departing from the scope hereof.

When the beamsplitter 116 is unbalanced, the interference between the optical signal 102 and local-oscillator field 104 mimics displacement of the quantum state of the optical signal 102 in phase space. Mathematically, displacement is represented by the unitary operator $\hat{D}(\beta)$ with a complex variable β that represents the magnitude and direction of the shift in phase space. If the optical signal 102 is in the coherent state $|\alpha\rangle$, then the displaced field 104 will be in the state $\hat{D}(\beta)|\alpha\rangle = |\alpha+\beta\rangle$. The beamsplitter 116 is typically a 99:1 beamsplitter such that the displaced field 104 is 1% of the local-oscillator field 106 and 99% of the optical signal 102 (ignoring reflections and transmission loss through the beamsplitter 116).

The quantum states representing the symbols of the constellation may not be orthogonal, as is the case for coherent states. As a result, the measurement outcome m may sometimes be erroneous (e.g., returning "1" when the displaced field 104 is in the vacuum state $|0\rangle$, or returning "0" when the displaced field 104 is not in the vacuum state). Experimental limitations, such as dark current from the single-photon detector 114 and an imperfect quantum efficiency of the single-photon detector 114, may also cause erroneous measurement outcomes. To reduce the error probability in the presence of these erroneous measurement outcomes, adaptive measurements with displacement may be used. The Dolinar receiver is one example of a quantum receiver that uses such an adaptive measurement technique.

To perform adaptive measurements, the quantum receiver 100 temporally divides the optical signal 102 into a sequence of N received segments 103(1), 103(2), . . . , 103(N), where N is a positive integer. The optical signal 102 has a symbol duration T and each received segment 103 has a segment duration $t_s$. While FIG. 1 shows all of the received segments 103 having the same segment duration $t_s$, the received segments 103 may alternatively have different segment durations. It is assumed that the quantum state of the optical signal 102, as originally transmitted, is constant in time for the symbol duration T. However, due to noise and other deleterious effects arising from the communication channel, the received segments 103 are unlikely to be in the same exact quantum state. The displaced field 104 forms a corresponding displaced sequence of N displaced segments 105, of which only one displaced segment 105($i$) is shown in FIG. 1 for clarity.

The single-photon detector 114 measures each displaced segment 105 and appends the resulting measurement outcome m to the measurement history M. Thus, immediately prior to the measurement of the $i^{th}$ displaced segment 105($i$), the measurement history M already stores the first i−1 measurement outcomes $m_1, m_2, \ldots, m_{i−1}$ obtained from the first i−1 displaced segments 105(1), . . . , 105(i−1). The signal-processing circuit 130 updates its hypothesis $S_h$ based on the measurement history M, determines the next displacement β based on the updated hypothesis $S_h$, and updates the displacement signal 180 accordingly. The single-photon detector 114 then measures the $i^{th}$ displaced segment 105($i$) to obtain the $i^{th}$ measurement outcome $m_i$. This feed-forward process continues until all N displaced segments 105 have been measured, at which point the signal-processing circuit 130 makes a final determination of the decoded symbol $S_d$ based on the measurement history M.

By using the measurement history M, as opposed to using only the one most-recent measurement outcome m, the signal-processing circuit 130 can update its hypothesis $S_h$ more accurately, i.e., with a lower error probability $P_e$. The error probability $P_e$ decreases as the number N of segments, and corresponding measurement outcomes, increases. However, the latency (i.e., the time needed to determine the next displacement β) increases with N due to the increased computational complexity, in turn limiting how small the segment time $t_s$ can be made. As a result of this latency, the symbol duration T increases with N, disadvantageously reducing the data signaling rate 1/T. To overcome this limitation, the present embodiments use a feed-forward (FF) machine-learning (ML) model 150 to that reduces latency, as compared to non-ML signal-processing techniques. Advantageously, this use of ML techniques limits how the minimum segment time $t_s$ scales with N, thereby helping to increase N with minimal increase in the symbol duration T. Note that the term "feed-forward" is not intended to refer to the internal structure of the ML model 150, but rather to its use for implementing adaptive measurements.

In some embodiments, the FF ML model 150 is an artificial neural network (ANN). In this case, the ANN may be structured as a multi-layer perceptron with an input layer of input neurons, each of which receives a corresponding one of the measurement outcomes $m_i$ of the measurement history M. The measurement history M may be padded (e.g., with a zero) for any measurement outcomes $m_i$ that has not yet been measured. The ANN may also have an output layer of output neurons, one for each symbol of the constellation. Each output neuron may generate a probability that the encoded symbol $S_e$ is the symbol associated said each output neuron, in which case the hypothesis $S_h$ may be updated to match the symbol associated with the output neuron having the highest probability. The ANN may contain one or more additional output neurons that generate the next displacement β. The ANN may contain any internal structure (e.g., the number of internal layers, number of neurons in each internal layer, sparse versus dense connections between layers, nonlinearity, etc.) without departing from the scope hereof. The FF ML model 150 may be another type of machine-learning model (e.g., a probability binary-tree classifier) without departing from the scope hereof.

The quantum receiver 100 may store the FF ML model 150 in the memory 142, as shown in FIG. 1. In this case, the processor 162 inputs the measurement history M to the FF ML model 150 to generate the next displacement β. To further reduce the latency of the signal-processing circuit 130, the quantum receiver 100 may alternatively store a FF look-up table 144 in the memory 142 instead of the FF ML model 150. The FF look-up table 144 is generated from the FF ML model 150, but executes faster than the FF ML model 150. In these embodiments, the processor 162 inputs the measurement history M to the FF look-up table 144 to generate the next displacement and determine symbol probabilities.

After all of the N displaced segments 105(1), . . . , 105(N) have been measured, and the corresponding N measurement outcomes $m_1, \ldots, m_N$ have been stored in the measurement history M, the signal-processing circuit 130 uses a decoder ML model 152 to make a final determination of the decoded symbol $S_d$. Specifically, the processor 162 inputs the measurement history M to the decoder ML model 152 to generate a probability for each symbol of the constellation, from which the decoded symbol $S_d$ may be selected as the symbol with the highest probability. The decoder ML model 152 may be an ANN, similar to the FF ML model 150. Furthermore, the decoder ML model 152 may be used to generate a decoder look-up table (not shown in FIG. 1) that executes faster than the decoder ML model 152.

The processor 162 may be any type of circuit capable of performing logic, control, and input/output operations. For example, the processor 162 may include one or more of a microprocessor with one or more central processing unit (CPU) cores, a graphics processing unit (GPU), a digital signal processor (DSP), a field-programmable gate array (FPGA), a system-on-chip (SoC), and a microcontroller unit (MCU). The processor 162 may also include a memory controller, bus controller, one or more co-processors, and/or other components that manage data flow between the processor 162 and other components communicably coupled to the bus 132. For some types of the processor 162 (e.g., an FPGA or the FPGA portion of a SoC), the processor 162 is hard-wired to perform the functionality described herein. For other types of the processor 162, the signal-processing circuit 130 stores machine-readable instructions that, when executed by the processor 162, cause the signal-processing circuit 130 to perform the functionality described herein. These machine-readable instructions may be stored in the memory 142. Alternatively, the machine-readable instructions may be stored as firmware in a separate read-only memory (ROM) that is communicably coupled to the processor 162 over a separate instruction bus.

In the above discussion, each measurement outcome $m_i$ is a binary indication of whether one or more photons was detected. In other embodiments, each measurement outcome $m_i$ is a non-negative integer indicating the number of photons detected for a given displaced segment 105($i$). In this case, the single-photon detector 114 and signal-processing circuit 130 implement photon-number-resolved (PNR) measurements. For example, the signal-processing circuit 130 may process the electrical output signal 178 by counting the number of pulses received during each segment 105(i) (assuming each measured photon outputs one electrical pulse), and then setting the measurement outcome $m_t$ to this number. The number of detected photons provides more information than a binary indication, and therefore the use of PNR measurements may help reduce probability errors or achieve convergence faster (i.e., reducing the number of segments N needed to achieve a target error probability). The FF ML model 150 may be alternatively configured for PNR measurements. For example, when the FF ML model 150 is an ANN, each input neuron of the ANN may receive the number of detected photons for a corresponding segment 105(i). Given the different format and quantity of the data, the FF ML model 150 will need to be trained differently for PNR, as compared to binary measurement outcomes.

In embodiments, a method for decoding an optical signal includes interfering the optical signal with a local-oscillator field to generate a displaced field. For example, the beamsplitter 116 of FIG. 1 interferes a portion of the optical signal 102 with a portion of a local-oscillator field 106 to generate a displaced field 104. The method also includes detecting the displaced field with a single-photon detector. For example, the single-photon detector 114 of FIG. 1 detects the displaced field 104. The method also includes determining, based on an electrical output of the single-photon detector, a measurement outcome. For example, the signal-processing circuit 130 of FIG. 1 receives the electrical output signal 178 from the single-photon detector 114, and determines, based on the electrical output signal 178, the measurement outcome m.

The method also includes determining, based on the measurement outcome and a feed-forward machine-learning model, a next displacement. For example, the signal-processing circuit 130 of FIG. 1 inputs the measurement outcome m to the FF ML model 150 to determine the next displacement β. In another example, the signal-processing circuit 130 inputs the measurement outcome m to the FF look-up table 144, as generated based on the FF ML model 150, to determine the next displacement β. The method also includes modulating, based on the next displacement, one or both of the optical signal and the local-oscillator field. For example, the signal-processing circuit 130 generates the displacement signal 180 based on the next displacement β. The displacement signal then drives the modulator 108 to modulate the local-oscillator field 106. Phase modulation may alternatively be performed on the optical signal 102, although the insertion loss of the phase modulator may be better tolerated by the local-oscillator field 106.

When the FF ML model 150 is a probabilistic binary-tree (PBT) classifier, the constellation may map to a set of coherent states with labels for different clusters. After time segmenting the received symbol into N segments, each measurement history M will have at most N bits (e.g., from 000 . . . 0 to 111 . . . 1). The binary-tree classifier contains N layers and $2^N$ leaf nodes. A measurement history M storing all N measurement outcomes is referred to as a full measurement history. By contrast, a measurement history M storing less than N measurement outcomes is referred to as a partial measurement history. Each leaf node of the binary tree stores the probability of occurrence for one corresponding full measurement history, while each internal node of the binary tree stores the probability of occurrence for one corresponding partial measurement history. For each displaced segment 105(i), the partial measurement history ($m_1$, $m_2$, . . . $m_i$) is used to find the corresponding internal node of the binary tree, from which the error probability and next displacement β are retrieved. Data stored in the nodes may be optimized towards a lower error rate with the help of backpropagation and gradient-based optimization algorithms.

When the quantum receiver 100 operates with run-time stochastic optimization with automatic differentiation (AD), the inputs and experimental data collection procedures are similar to that described above for the probabilistic binary-tree classifier. However, instead of optimizing the error rate independently by applying optimization algorithms on a computer, the optimization process is directly implemented using the quantum receiver 100. The error rate is provided in real-time by repeating operation of the quantum receiver 100. Then the gradient of the error rate is estimated by changing each the data stored the nodes of the binary tree. The forward automatic differentiation replaces the backpropagation.

Simulations

Figure 2:
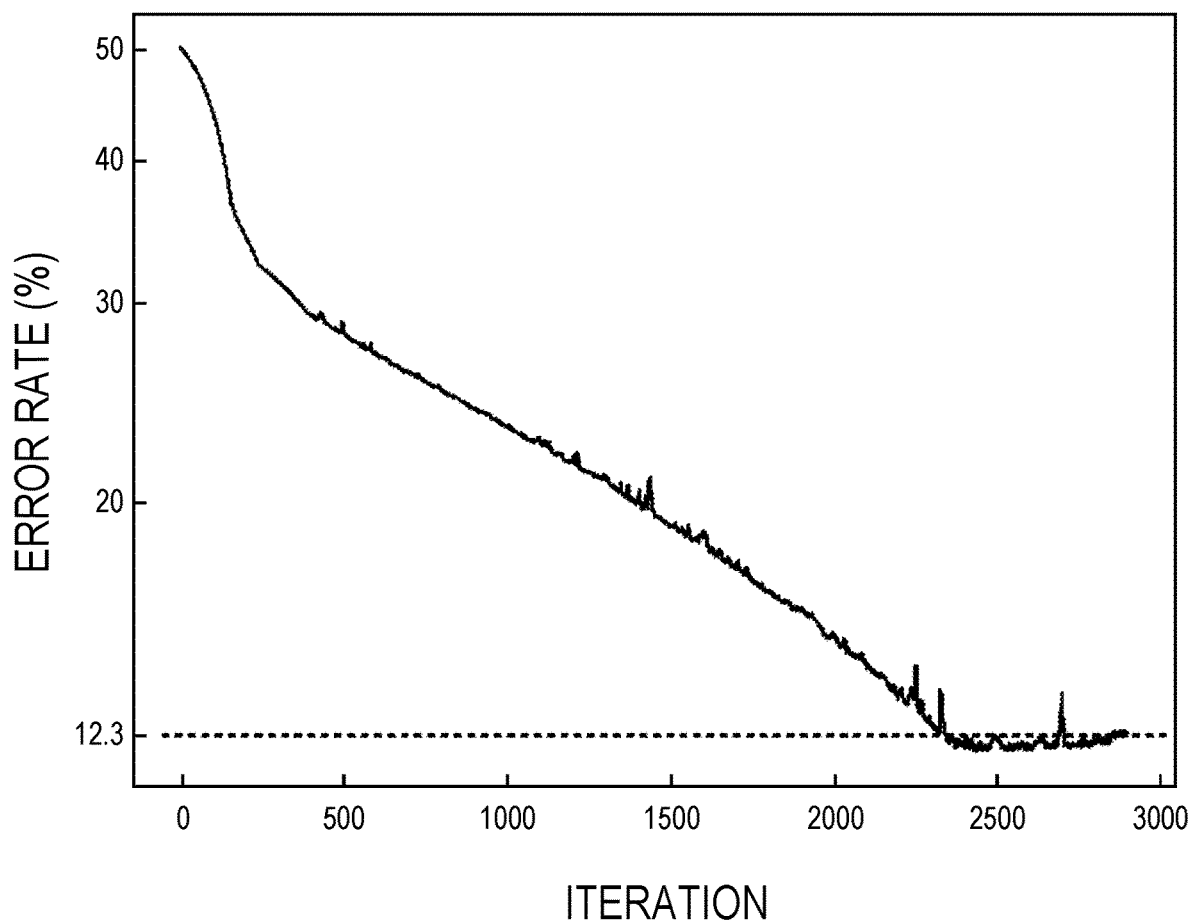
FIG. 2 is a learning curve that shows how the estimated error rate of the present embodiments reaches that of a Dolinar receiver.

FIG. 2 is a learning curve that shows how the estimated error rate of the present embodiments (when using an ANN for the FF ML model 150) reaches that of a Dolinar receiver. The solid black line is the simulated error rate, while the horizontal dashed line is the performance of the Dolinar receiver (i.e., 12.3%).

Figure 3:
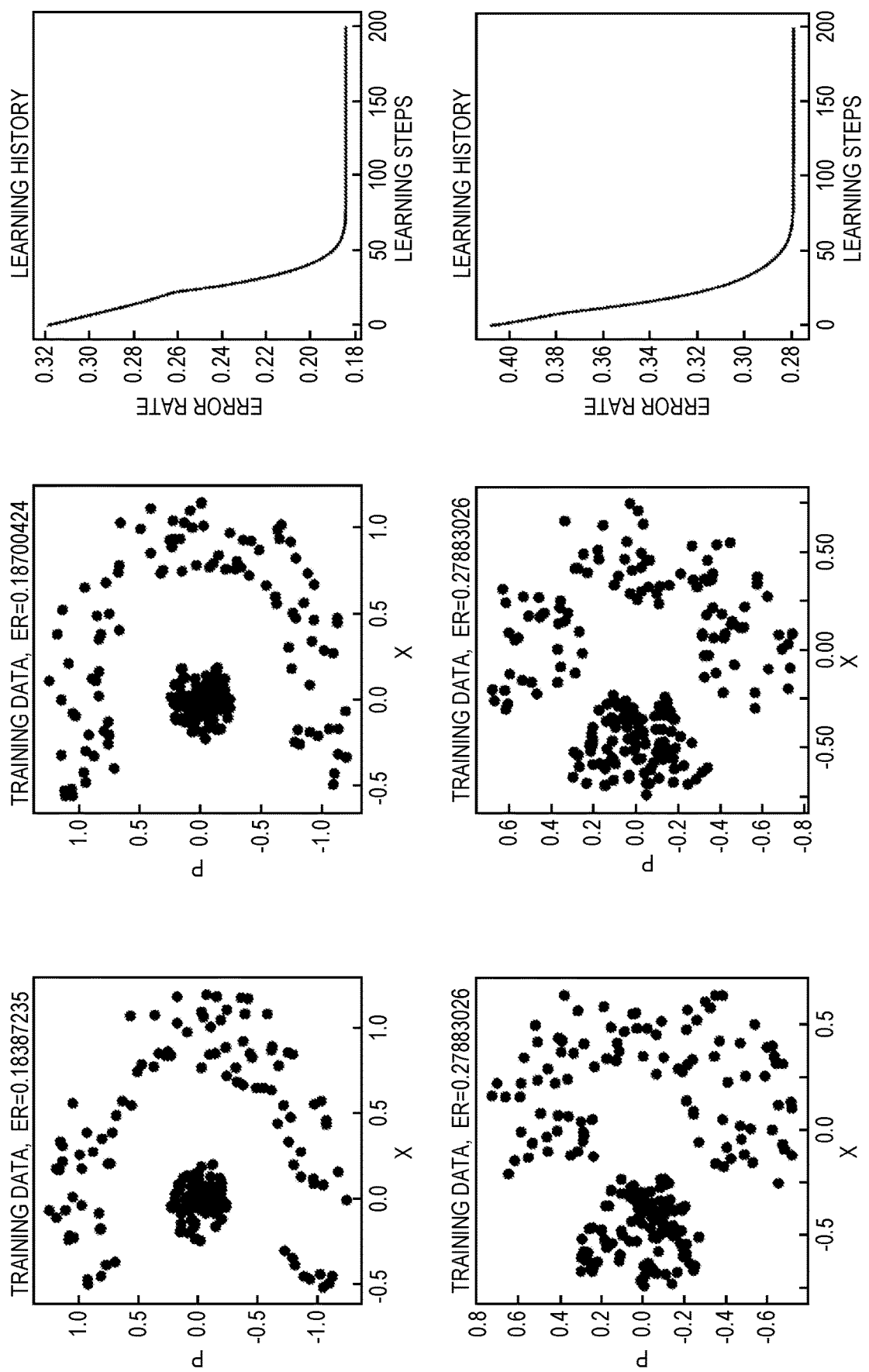
FIG. 3 shows training samples (left), testing samples (middle) and learning curve (right) of binary classification with two clusters, each with fifty samples. The performance of each scheme is better than the best classic measurement or generalized Kennedy receiver.

The binary-tree architecture was tested on ten-time-modes QPSK scheme (see FIG. 3) and binary classification tasks. For binary classification, the testing performance is near its training performance, indicating no significant overfitting or underfitting. It infers that the quantum receiver 100 is robust to noise or features for different incoming signals. For such tasks, if we do not know the prior distribution of where the samplings come from, the method based on Bayesian posterior probability may not be efficient as our learning architecture.

The AD architecture shares the same performances as the PBT architecture since the only difference is the method of the gradient estimation. In general, the AD architecture can handle a certain amount of real-time experimental ambient noise and imperfections.

Figure 4:
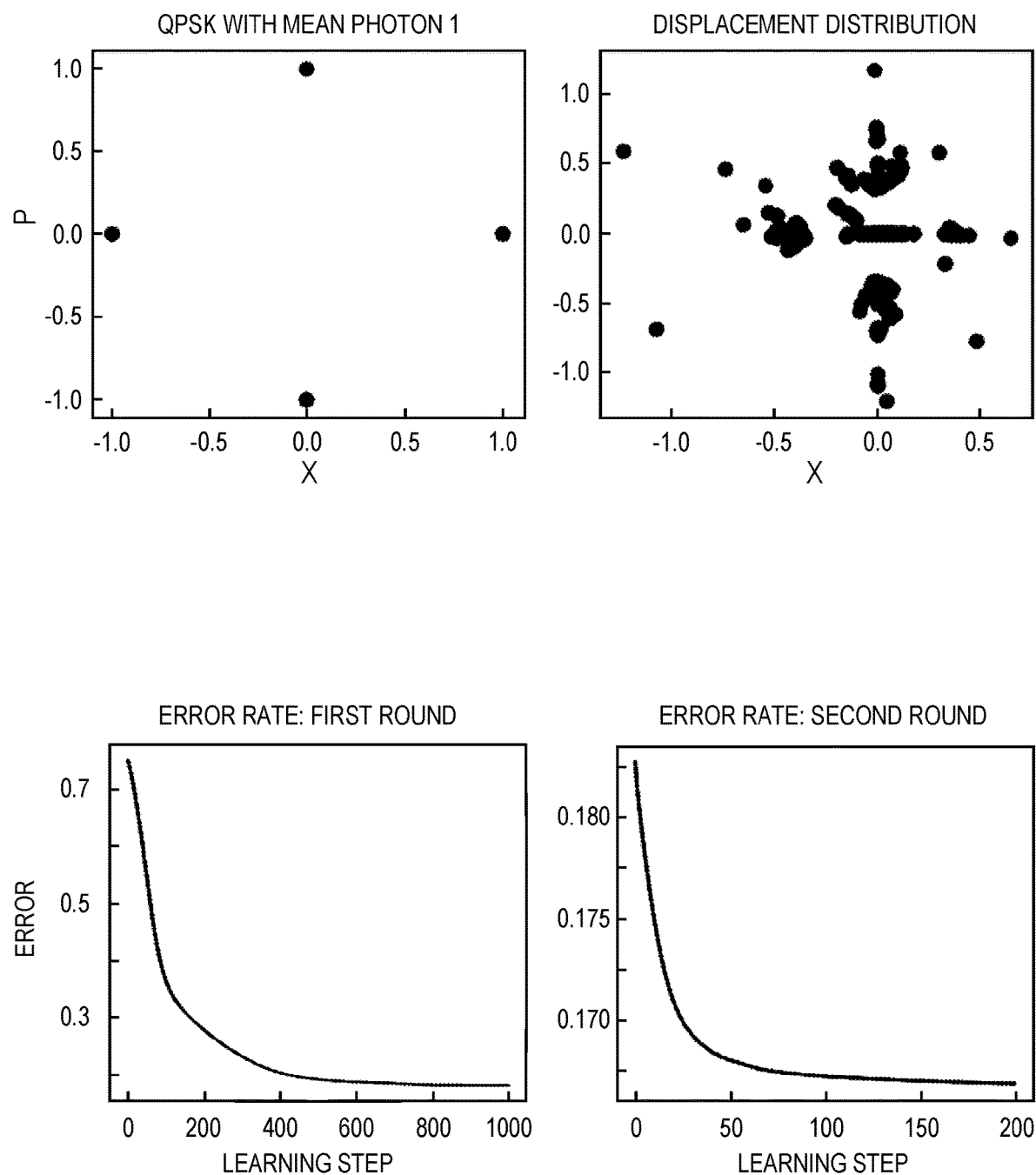
FIG. 4 shows quadrature phase-shift keying encoding (upper left), learned strategy (upper right) and learning curves of two rounds (lower left and right).

For QPSK (see FIG. 4), the quantum receiver 100 converges at the performance as the posterior one (error rate<16.7%) but with different displacement choices. The learning process contains two rounds with different optimizers. The first round learns a coarse strategy from a guess. Then it switches to the second rounds for lower error rate by a fine-tuning process. Regularization is applied between the two rounds to siphon off displacements that are too large or too small.

All the learning strategies are robust over a small tuning range since gradient-descent-based ML algorithms guarantee convergence at a local minimum.

Figure 5:
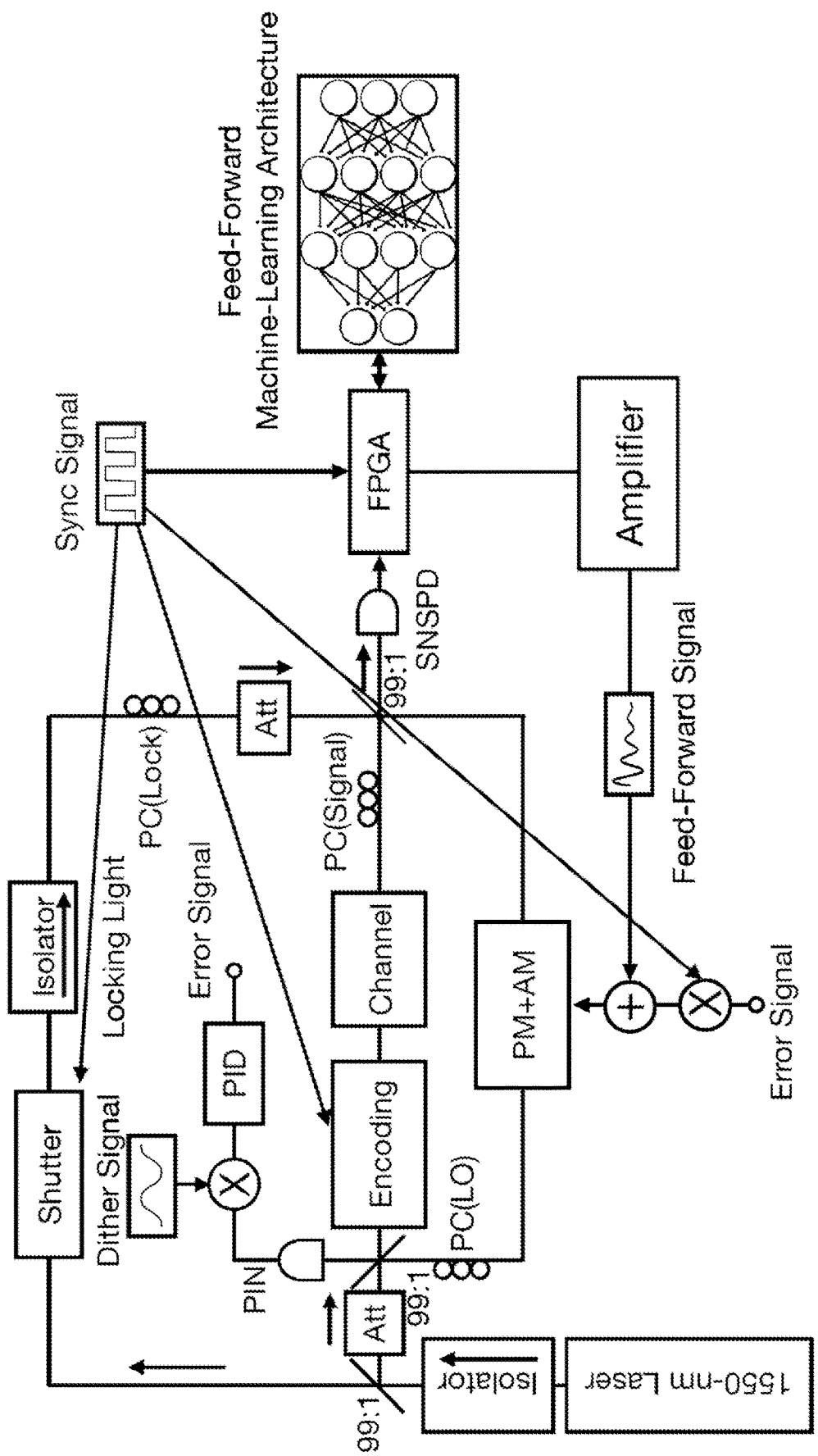
FIG. 5 shows an experimental setup for testing the quantum receiver of FIG. 1, in an embodiment.

FIG. 5 shows an experimental setup for testing the quantum receiver 100. The setup has an encoding module, a phase locking module, and a receiver module. The encoding module encodes the signal and mimics the channel. The displacement of the signal field is operated at the right 99:1 beamsplitter after interfering with the modulated LO. The single-photon detector (SNSPD) converts the absorbed photon to a nanosecond pulse that is sent to the FPGA.

The displacement operation of the signal field requires a stable phase difference between the local oscillator (LO) arm and the signal channel. The phase-locking module keeps the relative phase difference stable by feeding the error signal back to a phase modulator. The shutter controls turns the locking laser on and off. We designed the experiments by switching between locking and normal processes at 20 kHz frequency with a synchronization signal so that the locking light does not affect the signal processing. The visibility of the interference is an indicator of how stable the locked phase is. Our setup now offers 98% visibility which means we can displace the signal field to almost the vacuum. We expect the visibility to reach 99.6% with further improvements.

The receiver module includes a real-time feed-forward displacement control by the FPGA with variables learned from the machine-learning architecture. The FPGA reads the photon arriving time from the SNSPD and records to its memory. Then the logic circuit will search the lookup table and determine the next feed-forward signal for the displacement in the following round. The feed-forward signal is mixed with the synchronization signal and the error signal, then modulates the amplitude and the phase of the LO appropriately. The FPGA and all the ancillary electronics together provide the suitable displacement based on all the detection history.

We tested the PBT architecture, and it demonstrated a performance exceeding that of homodyne detection, even with several imperfections.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A quantum receiver for decoding an optical signal, comprising:
   a beamsplitter for interfering the optical signal with a local-oscillator field to generate a displaced field;
   a single-photon detector for detecting the displaced field;
   a signal-processing circuit for:
      determining, based on an electrical output of the single-photon detector, a measurement outcome; and
      determining, based on the measurement outcome and a feed-forward machine-learning model, a next displacement; and
   at least one modulator for modulating, based on the next displacement, one or both of the optical signal and the local-oscillator field.

2. The quantum receiver of claim 1, the feed-forward machine-learning model comprising one of an artificial neural network and a probability binary-tree classifier.

3. The quantum receiver of claim 1, wherein:
   the optical signal comprises a received sequence of received segments;
   the displaced field comprises a displaced sequence of displaced segments corresponding to the received sequence;
   the signal-processing circuit includes a memory storing a historical sequence of measurement outcomes corresponding to the displaced sequence; and
   the signal-processing circuit is configured to determine the next displacement based on the historical sequence.

4. The quantum receiver of claim 3, wherein:
   the memory stores a feed-forward look-up table generated from the feed-forward machine-learning model; and
   the signal-processing circuit is configured to determine the next displacement by inputting the historical sequence to the feed-forward look-up table.

5. The quantum receiver of claim 3, wherein:
   the memory stores the feed-forward machine-learning model; and
   the signal-processing circuit is configured to determine the next displacement by inputting the historical sequence to the feed-forward machine-learning model.

6. The quantum receiver of claim 3, the signal-processing circuit being configured to determine, based on the historical sequence and a decoding machine-learning model, a decoded state.

7. The quantum receiver of claim 6, the signal-processing circuit being configured to output the decoded state.

8. The quantum receiver of claim 6, the decoding machine-learning model comprising a neural network.

9. The quantum receiver of claim 6, wherein:
   the memory stores a decoder look-up table generated from the decoding machine-learning model; and
   the signal-processing circuit is configured to determine the decoded state by inputting the historical sequence to the decoder look-up table.

10. The quantum receiver of claim 6, wherein:
    the memory stores the decoding machine-learning model; and
    the signal-processing circuit is configured to determine the decoded state by inputting the historical sequence to the decoding machine-learning model.

11. The quantum receiver of claim 1, the beamsplitter being unbalanced.

12. The quantum receiver of claim 1, the at least one modulator comprising one amplitude modulator and one phase modulator.

13. A method for decoding an optical signal, comprising:
    interfering the optical signal with a local-oscillator field to generate a displaced field;
    detecting the displaced field with a single-photon detector;
    determining, based on an electrical output of the single-photon detector, a measurement outcome;
    determining, based on the measurement outcome and a feed-forward machine-learning model, a next displacement; and
    modulating, based on the next displacement, one or both of the optical signal and the local-oscillator field.

14. The method of claim 13, wherein:
    the optical signal comprises a received sequence of received segments;
    the displaced field comprises a displaced sequence of displaced segments corresponding to the received sequence; and
    said determining the next displacement is further based on a historical sequence of measurement outcomes corresponding to the displaced sequence.

15. The method of claim 14, wherein said determining the next displacement includes inputting the historical sequence to a feed-forward look-up table.

16. The method of claim 15, further comprising generating the feed-forward look-up table based on the feed-forward machine-learning model.

17. The method of claim 14, wherein said determining the next displacement includes inputting the historical sequence into the feed-forward machine-learning model.

18. The method of claim 14, further comprising determining, based on the historical sequence and a decoding machine-learning model, a decoded state.

19. The method of claim 18, further comprising outputting the decoded state.

20. The method of claim 18, the decoded state being one of:
    two candidate coherent states of a binary phase-shift keying constellation; and four candidate coherent states of a quadrature phase-shift keying constellation.

\* \* \* \* \*